United States Patent
Mrozek et al.

(10) Patent No.: US 9,714,370 B2
(45) Date of Patent: Jul. 25, 2017

(54) SOLVENT ASSISTED PROCESSING TO CONTROL THE MECHANICAL PROPERTIES OF ELECTRICALLY AND/OR THERMALLY CONDUCTIVE POLYMER COMPOSITES

(71) Applicant: U.S. Army Research Laboratory ATTN: RDRL-LOC-I, Adelphi, MD (US)

(72) Inventors: Randy A. Mrozek, Port Deposit, MD (US); Joseph L. Lenhart, Port Deposit, MD (US)

(73) Assignee: The United States of America as represented by The Secretary of the Army, Washington, DC (US)

( * ) Notice: Subject to any disclaimer, the term of this patent is extended or adjusted under 35 U.S.C. 154(b) by 465 days.

(21) Appl. No.: 14/037,991

(22) Filed: Sep. 26, 2013

(65) Prior Publication Data

US 2015/0083961 A1    Mar. 26, 2015

(51) Int. Cl.
*H01B 1/24* (2006.01)
*H01B 1/02* (2006.01)
(Continued)

(52) U.S. Cl.
CPC ............... *C09K 5/14* (2013.01); *H01B 1/20* (2013.01); *H01B 1/22* (2013.01); *H01B 1/24* (2013.01)

(58) Field of Classification Search
CPC ... H01B 1/04; H01B 1/20; H01B 1/22; H01B 1/24; C01B 31/02
(Continued)

(56) References Cited

U.S. PATENT DOCUMENTS 5,063,128 A * 11/1991 Yuh .................. G03G 5/104
430/131
5,126,403 A * 6/1992 Graiver ................ C08F 8/42
525/100
(Continued)

OTHER PUBLICATIONS

Khosla ("Micropatternable Multifunctional Nanocomposite Polymers for Flexible Soft NEMS and MEMS Applications." ECS Trans, 45(3), pp. 477-494, May 6-10, 2012).*
(Continued)

*Primary Examiner* — Tri V Nguyen
(74) *Attorney, Agent, or Firm* — Freda L. Krosnick; Robert Thompson (57) ABSTRACT

Electrically and/or thermally conductive polymer composites and methods of preparing same are provided. In some embodiments, a method for preparing an electrically and/or thermally conductive polymer composite may include (1) mixing a polymer, a conductive particulate filler, and a solvent to form a non-conductive polymer solution or melt; (2) processing, the non-conductive polymer solution or melt to form a non-conductive polymer network composition; wherein the presence of solvent during three-dimensional network formation manipulates the polymer network structure; and (3) removing the solvent from the non-conductive polymer network composition to form an electrically and/or thermally conductive polymer composite. The altered polymer chain structure present in the non-conductive polymer network composition is maintained in the composite, and offsets the impact of particulate filler addition including increased modulus, decreased elasticity, and decreased elongation at break. This method enables development of composite materials with electrical/thermal and mechanical performance that can be tailored independently.

14 Claims, 5 Drawing Sheets

(51) Int. Cl.
*C01B 31/04* (2006.01)
*H01M 4/60* (2006.01)
*C09K 5/14* (2006.01)
*H01B 1/20* (2006.01)
*H01B 1/22* (2006.01)

(58) Field of Classification Search
USPC ....... 252/500–519.1, 519.33; 423/445 R–418
See application file for complete search history.

(56) References Cited

U.S. PATENT DOCUMENTS

| | | | | |
|---|---|---|---|---|
| 7,411,019 | B1* | 8/2008 | Bley | B82Y 30/00 524/847 |
| 2006/0084742 | A1* | 4/2006 | Ishida | C08L 9/02 524/425 |
| 2006/0249447 | A1* | 11/2006 | Yeager | B01D 67/0011 210/506 |
| 2009/0142581 | A1* | 6/2009 | Heintz | B82Y 30/00 428/323 |
| 2009/0169866 | A1* | 7/2009 | Ostafin | B82Y 20/00 428/323 |
| 2009/0200517 | A1* | 8/2009 | El Bounia | B82Y 30/00 252/500 |
| 2011/0059317 | A1* | 3/2011 | Elhard | H01B 1/24 428/408 |
| 2011/0178224 | A1* | 7/2011 | Pan | B82Y 30/00 524/495 |
| 2012/0315547 | A1* | 12/2012 | Itoh | C08F 299/024 429/312 |
| 2013/0214214 | A1* | 8/2013 | Carnahan | H01B 1/24 252/511 |
| 2014/0217331 | A1* | 8/2014 | Hata | B82Y 30/00 252/511 |
| 2015/0243859 | A1* | 8/2015 | Schmidtke | H01L 33/56 257/98 |

OTHER PUBLICATIONS

Paglicawan ("Dispersion of Multiwalled Carbon Nanotubes in Thermoplastic Elastomer Gels: Morphological, Rheological, and Electrical Properties." Poly Composites, pp. 210-217, 2010).*
Ahmad ("The Electrical Conductivity of Polypropylene and Nickel-Coated Carbon Fiber Composite." Polym Composites,13(1), pp. 53-57, 1992).*
van Maanen ("Property and Morphology Development in Nanocomposite Thermoplastic Elastomer Gels." Langmuir, 21, pp. 3106-3115, web Mar. 5, 2005).*
Mrozek, R. A.; Cole, P. J.; Cole, S. M.; Schroeder, J. L.; Schneider, D. A.; Hedden, R. C.; Lenhart, J. L., "Design of nonaqueous polymer gels with broad temperature performance: Impact of solvent quality and processing conditions," J. Mater. Res. 2010, vol. 25, No. 6, 1105-1117.
Sivasailam, K.; Cohen, C., "Scaling behavior: Effect of precursor concentration and precursor molecular weight on the modulus and swelling of polymeric networks," J. Rheol. 2000, 44(4), 897-915.
Obukhov, S. P.; Rubinstein, M.; Colby, R.H., "Network Modulus and Superelasticity," Macromolecules 1994, 27, 3191-3198.
Martin, J. E.; Anderson, R. A.; Odinek, J.; Adolf, D.; Williamson, J., "Controlling percolation in field-structured particle composites: Observations of giant thermoresistance, piezoresistance, and chemiresistance," Physical Review B 2003, 67, 094207.
Read, D. H.; Martin, J. E., "Master Transduction Curve for Field-Structured Chemiresistor Calibration," Anal. Chem. 2010, vol. 82, No. 12, 5373-5379.
Wessling, B., "Dispersion as the link between basic research and commercial applications of conductive polymers (polyaniline)," Synth. Met. 1998, vol. 93, 143-154.
Polley, M. H.; Boonstra, B. B. S. T., "Carbon Blacks for Highly Conductive Rubber," Rubber Chem. Technol. 1957, 30, 170-179.
Untereker, D.; Lyu, S.; Schley, J.; Martinez, G.; Lohstreter, L., "Maximum Conductivity of Packed Nanoparticles and Their Polymer Composites," ACS Applied Materials & Interfaces 2009, vol. 1, No. 1, 97-101.
Koerner, H.; Liu, W.; Alexander, M.; Mirau, P.; Dowty, H.; Vaia, R. A., "Deformation—morphology correlations in electrically conductive carbon nanotube—thermoplastic polyurethane nanocomposites," Polymer 2005, 46, 4405-4420.
Ounaies, Z.; Park, C.; Wise, K. E.; Siochi, E. J.; Harrison, J. S., "Electrical properties of single wall carbon nanotube reinforced polyimide composites," Compos. Sci. Technol. 2003, 63, 1637-1646.
Sandler, J. K. W.; Kirk, J. E.; Kinloch, I. A.; Shaffer, M. S. P.; Windle, A. H., "Ultra-low electrical percolation threshold in carbon-nanotube-epoxy composites," Polymer 2003, 44, 5893-5899.
Du, F.; Scogna, R. C.; Zhou, W.; Brand, S.; Fischer, J. E.; Winey, K. I., "Nanotube Networks in Polymer Nanocomposites: Rheology and Electrical Conductivity," Macromolecules 2004, vol. 37, No. 24, 9048-9055.
Hussain, F.; Hojjati, M.; Okamoto, M.; Gorga, R. E., "Review article: Polymer-matrix Nanocomposites, Processing, Manufacturing, and Application: An Overview," J. Compos. Mater. 2006, vol. 40, No. 17, 1511-1575.
Chung, D. D. L., "Electromagnetic interference shielding effectiveness of carbon materials," Carbon 2001, 39, 279-285.
Sekitani, T.; Noguchi, Y.; Hata, K.; Fukushima, T.; Aida, T.; Someya, T., "A Rubberlike Stretchable Active Matrix Using Elastic Conductors," Science 2008, vol. 321, 1468-1472.
Koerner, H.; Price, G.; Pearce, N. A.; Alexander, M.; Vaia, R. A., "Remotely actuated polymer nanocomposites—stress-recovery of carbon-nanotube-filled thermoplastic elastomers," Nat. Mater. 2004, vol. 3, 115-120.
Someya, T.; Sekitani, T.; Iba, S.; Kato, Y.; Kawaguchi, H.; Sakurai, T., "A large-area, flexible pressure sensor matrix with organic field-effect transistors for artificial skin applications," Proceedings of the National Academy of Sciences of the United States of America 2004, vol. 101, No. 27, 9966-9970.
Someya, T.; Kato, Y.; Sekitani, T.; Iba, S.; Noguchi, Y.; Murase, Y.; Kawaguchi, H.; Sakurai, T., "Conformable, flexible, large-area networks of pressure and thermal sensors with organic transistor active matrixes," Proceedings of the National Academy of Sciences of the United States of America 2005, vol. 102, No. 35, 12321-12325.
Inventors: Randy A. Mrozek et al.; U.S. Appl. No. 61/883,171, filed Sep. 26, 2013, "Porous Polymer Composites".
Inventors: Randy A. Mrozek et al.; U.S. Appl. No. 61/903,773, filed Nov. 13, 2013, "Deformable Polymer Composites with Controlled Electrical Performance During Deformation Through Tailored Strain-Dependent Conductive Filler Contact".
Inventors: Justin L. Shumaker et al.; U.S. Appl. No. 14/163,016, filed Jan. 24, 2014, "Deformable Elastomeric Conductors and Differential Electronic Signal Transmission".

* cited by examiner

SOLVENT ASSISTED PROCESSING TO CONTROL THE MECHANICAL PROPERTIES OF ELECTRICALLY AND/OR THERMALLY CONDUCTIVE POLYMER COMPOSITES

GOVERNMENT INTEREST

Governmental Interest—The invention described herein may be manufactured, used and licensed by or for the U.S. Government.

FIELD OF INVENTION

Embodiments of the present invention generally relate to polymer composites and, more particularly, to flexible, electrically and/or thermally conductive polymer composites and methods of preparing flexible, electrically and/or thermally conductive polymer composites, with targeted mechanical properties.

BACKGROUND OF THE INVENTION

Electrically conductive polymeric materials may be implemented into applications such as electronic textiles, robotics, EMI shielding, and lightning strike protections. However, traditional methods of obtaining conductivity in polymeric materials, such as using inherently conductive polymers or adding conductive fillers to a polymer matrix, can be difficult to process, due to high melt temperatures and high viscosity, respectively. In addition, typical approaches for making electrically or thermally conductive polymers are focused on optimizing electrical and thermal transport and do not offer the ability to independently tune mechanical and electrical/thermal response.

One method of obtaining electrical conductivity in polymeric materials is to use inherently electrically conductive polymers such as polythiophene and polyanilene. However, most inherently electrically conductive polymers are rigid polymers with a high melt temperature and melt viscosity that are difficult to process.

Another method of obtaining electrical conductivity in polymeric materials is to add electrically conductive particulate fillers to a polymer. However, obtaining conductivity in polymeric materials through this method typically requires a high concentration (loading) of conductive particulate fillers. Adjacent filler particles must be in contact with or in close enough proximity to one another to create an electrically conductive pathway through the polymer. The threshold concentration of an electrically conductive particulate filler where an electrically conductive pathway is first formed is called the electrical percolation threshold. The high particulate filler concentrations required to obtain electrical conductivity in the polymer will cause the viscosity of the polymer composite to rise exponentially, thereby decreasing the ability to process the polymeric material. In addition, the particulate fillers will increase the modulus and decrease the elongation at break of the material at particulate loadings lower than those required to achieve electrical percolation.

While the electrical percolation threshold can be decreased by using high aspect ratio particulates, the processing of the polymer is still influenced by the mechanical percolation threshold which occurs at lower particulate loadings than the electrical percolation threshold regardless of particle geometry. The mechanical percolation threshold is the concentration of particulate in the polymer at or above which the particulates begin to impact the motion of adjacent particles, thereby affecting the mechanical properties of the polymer, such as viscosity and elasticity. With low filler particulate loading, the particulates are in a dilute regime where adjacent particulates do not influence each other and the viscosity is similar to the host polymer, typically increasing in a linear fashion with increasing filler loading. As the particulate filler concentration is further increased, the polymer-particle interfacial regions between adjacent particulate overlap, impacting the motion of adjacent particles, and producing a dramatic increase in the viscosity, which is non-linear with increasing filler loading. To obtain electrical conductivity, the particulate loading must be further increased into a concentrated regime where the particles are in direct contact with one another or the inter-particle spacing is very small. This results in an exponential increase in the viscosity. As a result, it is very difficult to process most electrically conductive polymer composites regardless of filler geometry. Similar to viscosity, the modulus of the particulate loaded polymer increases with increasing particulate loading. Therefore it is difficult to produce a flexible polymer that is conductive with a targeted mechanical stiffness.

The incorporation of thermally conductive particulate fillers into a polymer to obtain thermal conductivity suffers from the same drawbacks as obtaining electrical conductivity in a polymer composite by incorporating electrically conductive particulates including difficulty processing using traditional processing techniques, increased modulus, and decreased elongation at break.

Most electrically conductive particulate fillers are also thermally conductive however, several thermally conductive particulate are not electrically conductive.

Therefore, the inventors have provided improved flexible, electrically and/or thermally conductive polymer composites and methods of preparing such flexible, electrically and/or thermally conductive polymer composites, with an ability to simultaneously control mechanical flexibility in addition to electrical and/or thermal conductivity.

BRIEF SUMMARY OF THE INVENTION

Embodiments of the present invention relate to flexible conductive polymer composites and methods of preparing flexible conductive polymer composites, where the conductivity and mechanical stiffness of the conductive polymer composites may be simultaneously controlled using the method herein. The conductive polymer composites may be electrically conductive, thermally conductive, or both electrically and thermally conductive. Conductive polymer composites of the present invention are referred to herein as "electrically and/or thermally conductive polymer composites."

In some embodiments, a method of forming an electrically and/or thermally conductive polymer composite may include (1) mixing a polymer with a conductive particulate filler and a solvent compatible with the polymer to form a particle-filled, non-conductive polymer solution or melt; wherein the conductive particulate filler is electrically conductive, thermally conductive, or both; and wherein the amount of conductive particulate filler in the polymer solution or melt is below the mechanical percolation threshold and the electrical and/or thermal percolation threshold for the conductive particulate filler; (2) processing the particle-filled, non-conductive polymer solution or melt into a non-conductive polymer network composition; and (3) removing the solvent from the non-conductive polymer network composition to concentrate the polymer and conductive particulate filler therein to form an electrically and/or thermally conductive polymer composite.

The presence of solvent impacts the structure of the polymer network formed and present in the non-conductive polymer network composition, and hence the mechanical properties of the electrically and/or thermally conductive polymer composite. Using the method described, the desired mechanical properties can be controlled independent of the particulate filler concentration.

One having ordinary skill in the art will recognize that when an electrically conductive particulate filler is used, the amount of it present in the non-conductive polymer solution or melt is below the mechanical percolation threshold and below the electrical percolation threshold of the filler. When a thermally conductive particulate filler is used, the amount of it present in the non-conductive polymer solution or melt is below a mechanical percolation threshold and below the thermal percolation threshold of the filler. Similarly, when a conductive particulate filler is used that is both electrically conductive and thermally conductive, the amount of it present in the polymer solution or melt is below a mechanical percolation threshold, below the electrical percolation threshold, and also below the thermal percolation threshold of the particulate filler.

In some embodiments, an electrically and/or thermally conductive polymer composite may include a cross-linked polymer network therein and a conductive particulate filler dispersed within the cross-linked polymer network. The conductive particulate filler is electrically conductive, thermally conductive, or both electrically and thermally conductive. The conductive particulate filler is present in an amount that is at or above a mechanical percolation threshold and at or above an electrical and/or thermal percolation threshold, as appropriate, of the conductive particulate filler.

Other and further embodiments of the invention are described in more detail, below. The embodiments described are provided for example purposes only. The invention is not intended to be limited thereto.

BRIEF DESCRIPTION OF THE DRAWINGS

So that the manner in which the features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
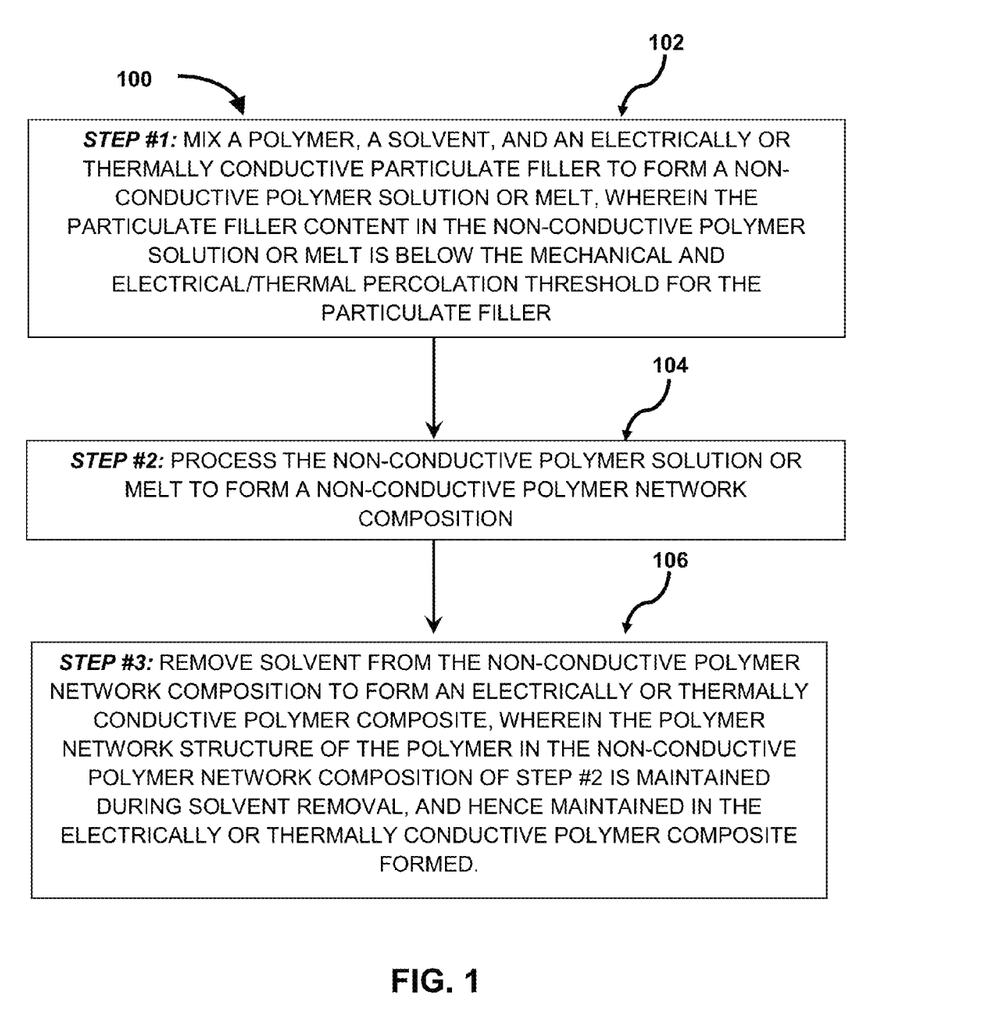
FIG. 1 depicts a flow diagram of a method of preparing an electrically and/or thermally conductive polymer composite in accordance with some embodiments of the present invention.

As used herein, the phrases "particle-filled, non-conductive polymer solution or melt," "non-conductive polymer solution or melt," and "polymer solution or melt" are used interchangeably to refer to a solution or melt resulting from the initial mixing of a polymer, a solvent, and a conductive particulate filler as set forth, for example, in Step #1 of FIG. 1 herein.

"Conductive particulate fillers" may be electrically conductive, thermally conductive, or both.

The phrases "electrically or thermally conductive particulate fillers," "electrically or thermally conductive fillers," and "electrically or thermally conductive filler particles" are used interchangeably herein.

The phrase "electrically and/or thermally conductive polymer composite" as used herein is intended to include a conductive polymer composite within the scope of the present invention that may be electrically conductive, thermally conductive or both electrically and thermally conductive. If electrically conductive, it would contain an electrically conductive particulate filler therein; if thermally conductive, it would contain a thermally conductive particulate filler therein. Similarly if both electrically and thermally conductive it may contain, for example, either a conductive particulate filler having both conductivity properties, or an electrically conductive particulate filler and a thermally conductive particulate filler therein.

Reference to "electrical/thermal percolation threshold" is used to refer to electrical percolation threshold, thermal percolation threshold, or both depending on the property of the conductive particulate filler employed.

The phrases "polymer network structure", and "network structure" are used interchangeably herein. These phrases are intended to refer to the ways in which the polymer chains are interconnected with each other in the polymer network of the non-conductive polymer network composition, which polymer network structure can control the mechanical properties of flexible polymers. Of note is that the "polymer network structure" present in a non-conductive polymer network composition is retained in the electrically and/or thermally conductive polymer composite resulting from removal of solvent from the non-conductive polymer network composition.

Embodiments of the present invention include flexible, electrically and/or thermally conductive polymer composites and methods of preparing flexible, electrically and/or thermally conductive polymer composites. Electrically and/or thermally conductive polymer composites and methods of preparing flexible, electrically and/or thermally conductive polymer composites, in accordance with embodiments of the present invention, may advantageously allow for the ability to independently tailor the mechanical properties of a polymer including modulus, elasticity, and elongation at break, independent of the conductive particulate filler loading.

FIG. 1 depicts a flow diagram of a method 100 of preparing an electrically and/or thermally conductive polymer composite in accordance with some embodiments of the present invention.

The method 100 starts at 102 by mixing a polymer, an electrically or thermally conductive particulate filler, and a solvent compatible with the polymer to form a particle-filled, non-conductive polymer solution or melt. The amount of electrically or thermally conductive particulate filler in the non-conductive polymer solution or melt is below the mechanical percolation threshold and below the electrical or thermal percolation threshold, depending on the type of conductive particulate filler used. The mechanical percolation threshold is the filler particle concentration at or above which the conductive filler particles in the non-conductive polymer solution or melt begin to affect each other, and thereby affect the mechanical properties of the non-conductive polymer solution or melt, such as, for example, affecting its viscosity. The electrical percolation threshold is the filler particle concentration at or above which an electrically conductive filler pathway through the polymer solution or melt is formed. Similarly, the thermal percolation threshold is the filler particle concentration at or above which a thermally conductive filler pathway through the polymer solution or melt is formed.

In some embodiments, the polymer is an elastomeric polymer such as, for example purposes only, poly(styrene-b-ethylene-co-butylene-b-styrene), poly(styrene-b-isoprene-b-styrene), poly(styrene-b-butadiene-b-styrene), natural rubber, polybutadiene, chloroprene, butyl rubber, nitrile rubber, silicone rubber, silicone elastomer, fluorosilicone rubber, poly(propylene oxide) rubber, or epoxy elastomer.

The electrically conductive particulate filler can be organic or inorganic in nature. In some embodiments, the electrically conductive particulate filler is selected from the group consisting of carbon nanotubes, nickel spheres, nickel nanostrands, carbon black, graphene flakes, nickel flakes, gold flakes, silver flakes, or other metal flakes, nickel coated carbon fibers, nickel coated carbon nanotubes, gold spheres, gold nanorods, silver spheres, silver nanorods, copper spheres, copper nanorods, carbon nanofiber polyaniline, polythiophene, polyacetylene, polyphenylene sulfide and polyphenylene vinylene. In some embodiments, the amount of electrically conductive particulate filler in the non-conductive polymer solution or melt is about 0.01 volume percent to about 55 volume percent. In some embodiments, the amount of electrically conductive particulate filler in the non-conductive polymer solution or melt is at most about 55 volume percent. In some embodiments, the amount of electrically conductive filler in the non-conductive polymer solution or melt is about 0.01 volume percent to about 10 volume percent. Electrically conductive particulate fillers of any particle shape, surface roughness, size or size distribution may be employed herein. One with ordinary skill in the art will recognize that particle shape, surface roughness, size, or size distribution will impact the particulate concentration required to reach mechanical percolation and electrical percolation, and will be able to select suitable concentrations of these to employ herein.

Thermally conductive particulate fillers that may be employed include the electrically conductive particulate fillers set forth above, as well as thermally conductive particulate fillers that are not electrically conductive, such as, for example purposes only, aluminum nitride, aluminum oxide, beryllium oxide, boron nitride, diamond, gallium arsenide, glass, indium phosphide, sapphire, sodium chloride, zinc oxide, or the like. In some embodiments, the amount of thermally conductive filler in the non-conductive polymer solution or melt is about 0.01 volume percent to about 55 volume percent. In some embodiments, the amount of thermally conductive filler in the non-conductive polymer solution or melt is at most about 55 volume percent. In some embodiments, the amount of thermally conductive filler in the non-conductive polymer solution or melt is about 0.01 volume percent to about 10 volume percent. Thermally conductive particulate fillers of any particle shape, surface roughness, size or size distribution may be employed herein. One with ordinary skill in the art will recognize that particle shape, surface roughness, size, or size distribution will impact the particulate concentration required to reach mechanical percolation and thermal percolation, and will be able to select suitable concentrations of these to employ herein.

The solvent selected is dependent on the specific chemistry of the polymer employed. Preferably, the selected solvent is miscible with the polymer. For example, in some embodiments, where the polymer is poly(styrene-b-ethylene-co-butylene-b-styrene), the solvent can be mineral oil. In some embodiments, where the polymer is a silicone elastomer, the solvent can be a silicone oil or toluene. In some embodiments, where the polymer is an epoxy elastomer or polybutadiene, the solvent can be dibutyl-phthalate. Other solvents that may be used herein include, for example purposes only, polydimethylsiloxane, water, acetone, methanol, ethanol, propanol, ethylhexanol, dodecane, decanol, cylcohexane, butanol, tetrahydrofuran, polydiethylsiloxane, chloroform, methylene chloride, dimethyl formamide, ethylene glycol, methyl ethyl ketone, acetophenone, dimethyl sulfoxide, and bis-ethyl hexyl sebacate, or other polymer solvents.

In some embodiments, the amount of solvent in the non-conductive polymer solution or melt is about 10 volume percent to about 95 volume percent. In some embodiments, the amount of solvent in the non-conductive polymer solution or melt is about 0.5 volume percent to about 10 volume percent.

Next at 104, the non-conductive polymer solution or melt is processed into a non-conductive polymer network composition. The non-conductive polymer solution or melt is processed so as to cross link the polymers therein to form the non-conductive polymer network composition. The polymers present in the non-conductive polymer network composition are physically cross-linked, chemically cross-linked or a combination of both. As used herein the phrase "polymer network" refers to, for example, a physically and/or chemically cross-linked polymer where chemical and/or physical cross-linking junction points are tied together by polymer chains into a three-dimensional web of polymer chains. In some embodiments, the non-conductive polymer network composition is shaped into a desired form by, for example, extruding, molding, or a combination of both.

In some embodiments, the non-conductive polymer solution or melt is processed to form a non-conductive polymer network composition wherein the polymers therein are physically crosslinked via, for example, hydrogen bonding, metal coordination cross-linking, ionic interactions, crystalline domains, phase separated domains, or other physical associations. Physically cross-linked non-conductive polymer network compositions include block co-polymers, thermoplastic elastomers, or other phase separating systems. In some embodiments, the non-conductive polymer solution or melt is processed to form a non-conductive polymer network composition wherein the polymers therein are chemically cross-linked by covalent bonds. Examples of covalent reactions commonly used in chemical cross-linked elastomers include epoxy-amine, epoxy-hydroxyl, "click", thiol-ene, vinyl-silane, polyurethane, free radical, cross-linked polybutadiene, diels alder coupling chemistries, and rubber vulcanization. Other methods of physically or chemically cross-linking polymers may be used to process the non-conductive polymer solution or melt so as to cross link the polymers therein to form a non-conductive polymer network composition.

The presence of solvent during non-conductive polymer network composition formation impacts the polymer network structure therein in, for example, two ways. First, the solvent dilutes the polymer chains prior to cross-linking thus reducing the number of entanglements in the cross-linked network produced. When the molecular weight between cross-links is above the molecular weight of entanglement for the polymer, the mechanical properties of the non-conductive polymer network composition formed are predominantly determined by the entanglements rather than the cross-link density. As a result, a change in the entanglement density can have a significant impact on the mechanical properties of the non-conductive polymer network composition. Second, the solvent enhances the frequency of loop defects or dangling ends, rather than forming an elastic bridge to an adjacent chain. The bridges contribute to the modulus of the composite whereas in most cases the loops and dangling ends do not. As a result, both the reduction of entanglements and enhanced formation of loops and dangling ends decrease the modulus and increase the flexibility in the non-conductive polymer network composition produced as well as in the electrically or thermally conductive polymer composite formed in Step #3 (106), below. This "solvent-assisted processing" enables the modulus flexibility and elongation at break to be tuned through the initial polymer content used in the formulation. As a result, the selection of solvent concentration can be used to manipulate the network structure and obtain the desired mechanical properties. Stated differently, the incorporation of solvent during non-conductive polymer network composition formation manipulates the polymer network structure therein, including the fraction of elastic bridging chains, trapped chain entanglements, loops, and dangling chain ends, which enables the modification of mechanical properties of the composite of the present invention formed. The polymer network structure present in the non-conductive polymer network composition persists after solvent extraction there from.

Next at 106, the solvent within the non-conductive polymer network composition is removed to concentrate the polymer and electrically or thermally conductive particulate filler therein and form the electrically and/or thermally conductive polymer composite of the invention. Of note is that changes made to the polymer network structure as a result of the solvent being present during non-conductive polymer network composition formation persists after solvent removal, thereby enabling the mechanical properties of the polymer network to be tailored by the initial solvent content during non-conductive polymer network composition formation. The polymer network structure present in the non-conductive polymer network composition persists into the electrically and/or thermally conductive polymer composite herein because the polymer network is chemically and/or physically cross linked. The method described herein can be used to advantageously offset the decreased elongation at break, decreased elasticity and increased stiffness that typically accompanies the incorporation of electrically and/or thermally conductive particulate filler into a polymer network.

In some embodiments, the solvent is removed from the non-conductive polymer network composition by evaporation in ambient conditions or through heating. In some embodiments, the solvent is removed from the non-conductive polymer network composition by extraction using a secondary, more volatile solvent. Examples of extraction include submersion into a secondary solvent bath, soxhlet extraction, or supercritical carbon dioxide. In some embodiments, about 10 volume percent to about 100 volume percent of the solvent is removed from the non-conductive polymer network composition. In some embodiments, at least about 95 volume percent of the solvent is removed from the non-conductive polymer network composition.

Figure 2A:
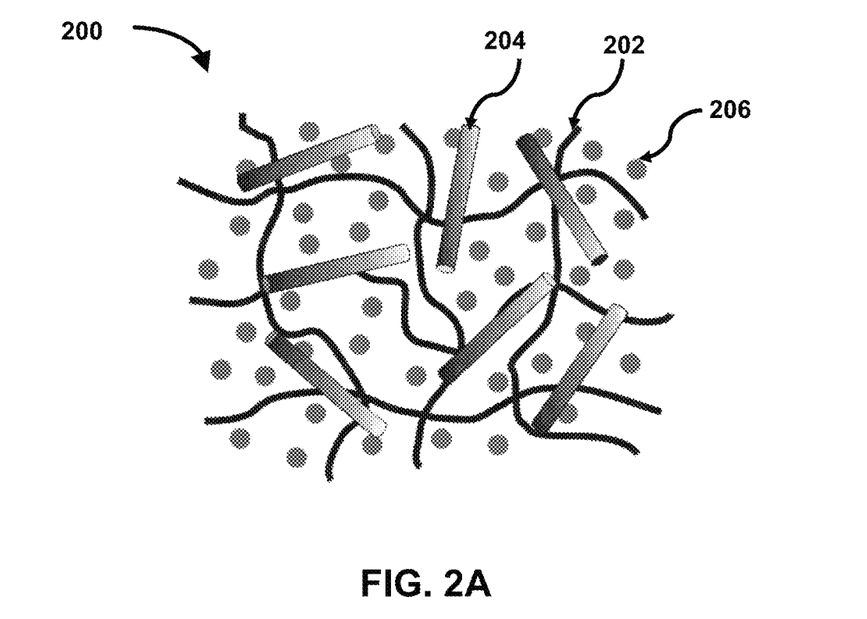
FIG. 2A depicts a particle-filled, non-conductive polymer network composition in accordance with some embodiments of the present invention.
Figure 2B:
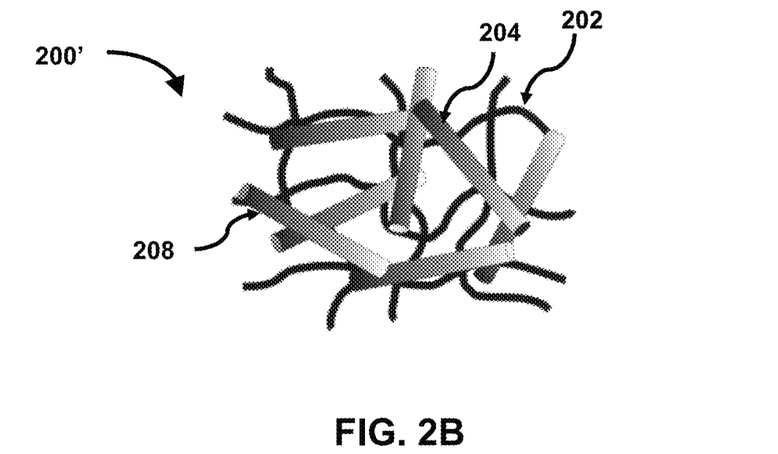
FIG. 2B depicts an electrically and/or thermally conductive polymer composite in accordance with some embodiments of the present invention.

FIG. 2A depicts a non-conductive polymer network composition 200 in accordance with some embodiments of the present invention. As illustrated, the non-conductive polymer network composition 200 comprises a physically and/or chemically cross-linked polymer 202, electrically conductive particulate filler 204 and solvent 206. The amount of electrically conductive particulate filler 204 in the non-conductive polymer network 200 is below a mechanical percolation threshold and below an electrical percolation threshold of the electrically conductive particulate filler 204, rendering the polymer network composition 200 non-conductive. Following the method described above, the solvent 206 is removed from the non-conductive polymer network composition 200. FIG. 2B depicts the electrically conductive polymer composite 200' formed after removal of the solvent 206 from the non-conductive polymer network composition 200 in FIG. 2A. Removal of the solvent 206 concentrates the physically and/or chemically cross-linked polymer 202 and electrically conductive filler 204, allowing the electrically conductive filler 204 to be in contact, or in close enough proximity, to create a conductive network 208 through the polymer. Of note is that polymer network structure present in the non-conductive polymer network composition is maintained during solvent removal, and hence maintained in the electrically conductive polymer composite formed.

In one embodiment, the polymer is poly(styrene-b-ethylene-co-butylene-b-styrene) (referred to as "SEBS"), the electrically conductive particulate filler is a nickel-coated carbon fiber and the solvent is mineral oil. In this embodiment, mixtures of SEBS and mineral oil having different amounts of mineral oil therein were prepared—the mixtures prepared contained 90, 80 and 70 volume percent mineral oil therein. The SEBS and mineral oil were mixed and heated to 150° Celsius for approximately 3 hours. Nickel-coated carbon fibers (NCCF) having a diameter of approximately 10 µm and having a length of approximately 500 µm (manufactured by Sulzer Metco (Fort Saskatchewan, Alberta, Canada) were added at 5, 10, 15, 20, and 30 volume percent relative to the SEBS polymer content in the non-conductive polymer solution or melt prepared. The mixtures were mechanically stirred for 15 minutes at 150° Celsius. Samples were cast at 120° Celsius, 135° Celsius, and 150° Celsius for samples containing 90, 80, and 70 volume percent mineral oil, respectively, to minimize particle settling while facilitating effective degassing. Once cooled, the cast sheets were then cut into 5×18×40 mm rectangular samples for solvent removal and rheological testing. The mineral oil was extracted from the non-conductive polymer network composition prepared by placing the rectangular sample in 1-butanol. The 1-butanol was replaced every 48 hours and the extraction progress monitored by measuring the mass loss of the rectangular sample. The extraction was considered complete when about 95% of the mineral oil was removed.

Figure 3A:
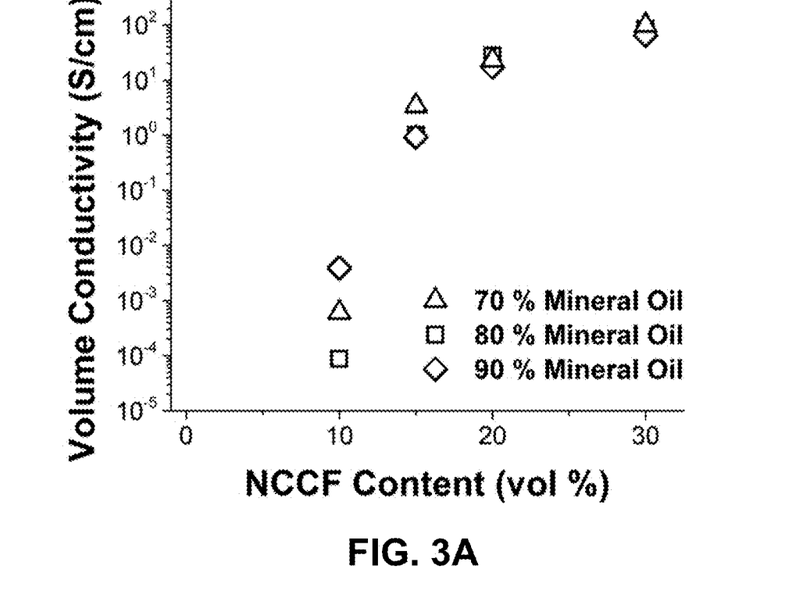
FIG. 3A depicts a graph of volume conductivity as a function of particle filler loading in an electrically conductive polymer composite in accordance with some embodiments of the present invention.

The resistance values of the electrically conductive polymer composite samples prepared were measured via a 4-wire contact method, and normalized by the sample dimensions to obtain the volume resistivity, and were reported as the volume conductivity (inverse of the volume resistivity) in S/cm. FIG. 3A contains the volume conductivity measurements obtained after mineral oil extraction for electrically conductive polymer composite samples produced with initial mineral oil concentrations of 70, 80, and 90 volume percent and NCCF concentrations at 5, 10, 15, 20, and 30 volume percent of the SEBS content. The electrically conductive polymer composites exhibited a measurable resistance value at 10 volume percent indicating a particulate loading above the electrical percolation threshold. At higher NCCF loadings all of the electrically conductive polymer composites have very similar conductivity values indicating that the mineral oil content in the initial formulation did not have a significant impact on the electrical performance of the resulting composite. The larger variation in values at 10 volume percent NCCF is attributed to the concentration being near the percolation threshold where small changes in loading will have a large impact on the electrical properties.

Figure 3B:
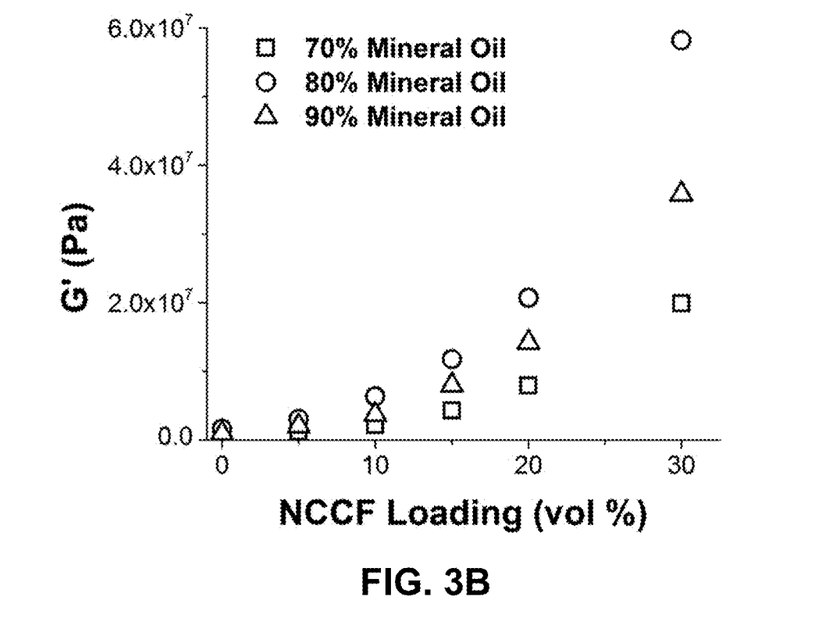
FIG. 3B depicts a graph of the shear storage modulus as a function of particle filler loading in an electrically conductive polymer composite in accordance with some embodiments of the present invention.

Rheological measurements, such as strain sweeps and frequency sweeps, were conducted on the electrically conductive polymer composite samples. Strain sweeps were conducted from 0.01 to 30% strain at a frequency of 1 Hz to determine the linear viscoelastic region of the electrically conductive polymer composite sample where the response is independent of the amount of strain. Frequency sweeps were performed from 0.01 to 3 Hz at 0.01, 0.1 and 1% strain. The data reported was obtained at 0.01% strain. FIG. 3B contains the shear storage modulus measured after mineral oil extraction for electrically conductive polymer composite samples produced with initial mineral oil concentrations of 70, 80, and 90 volume percent and NCCF concentrations at 0, 5, 10, 15, 20, and 30 volume percent of the SEBS content. This data demonstrates a decrease in the modulus by a factor of 3 when the mineral oil content in the initial formulation, the particle-filled, non-conductive polymer solution or melt, is increased from 70 to 90%. The combination of FIGS. 3A and 3B demonstrates the ability to tailor the mechanical properties of the electrically conductive polymer composite while maintaining the electrical performance at a specific NCCF concentration.

Figure 4:
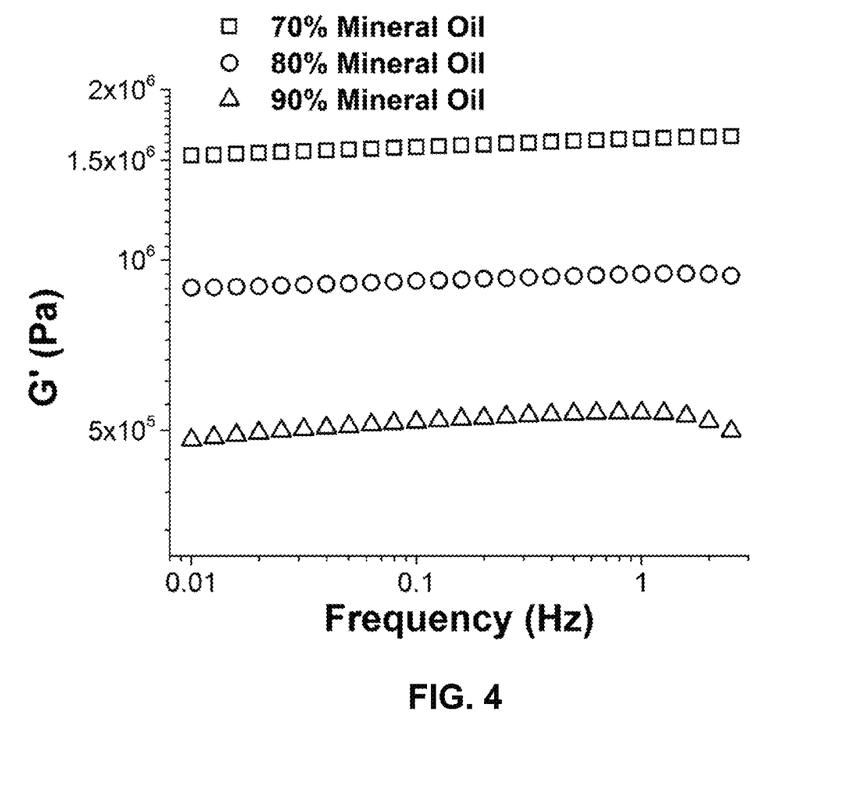
FIG. 4 depicts a graph of frequency dependent modulus data for non-particle filled (unfilled) polymer network control samples prepared using the method described herein to demonstrate the impact of solvent on the polymer chain structure in the network and the resulting mechanical properties even in the absence of particulate. The composite was prepared using poly(styrene-b-ethylene-co-butylene-b-styrene) elastomer with 70, 80, and 90 volume percent mineral oil, respectively.

FIG. 4 depicts frequency dependent modulus data for non-particle filled (unfilled) polymer network control samples prepared using the method described herein on the resulting mechanical properties. Stated differently, the final composition contains 0 volume percent particulate filler and consists of only the polymer network. Similar to the data in FIG. 3B obtained from polymer networks that contain particulate filler, when the mineral oil content in the initial polymer solution is increased from 70 volume % to 90 volume % the modulus of the polymer network obtained after solvent extraction decreased by a factor of 3. This data demonstrates the solvent concentration that is present during polymer network formation can be exploited to manipulate the polymer network structure leading to a change in the mechanical properties. This manipulation of the polymer network structure with initial solvent loading can occur with or without particulate filler present during network composition formation.

Figure 5:
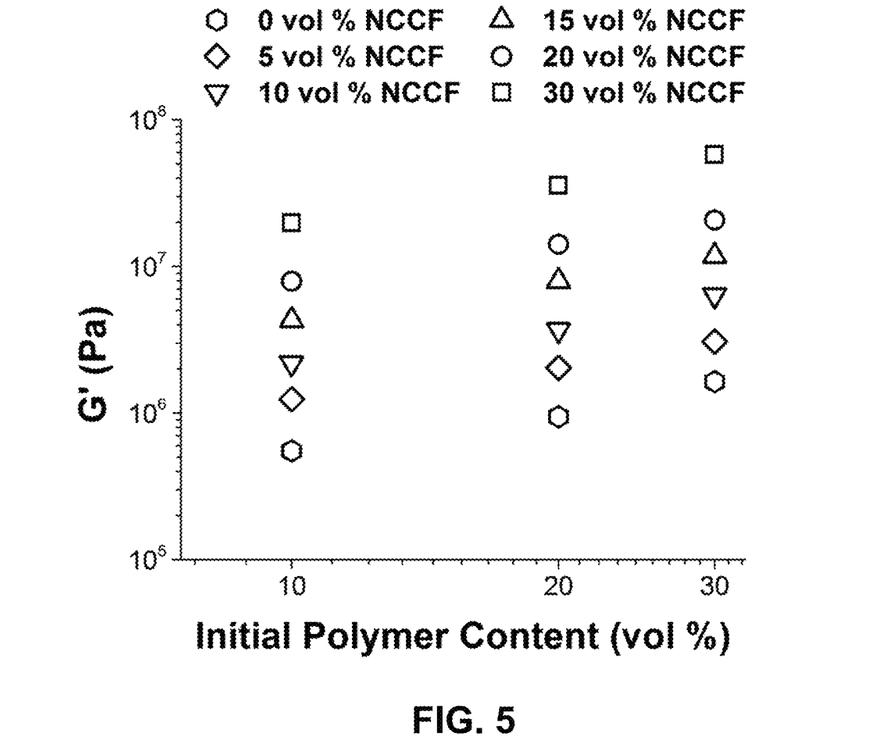
FIG. 5 depicts a graph of the shear storage modulus as a function of initial polymer content for electrically conductive polymer composites containing 0, 5, 10, 15, 20, and 30 volume percent of nickel coated carbon fiber in the final composite. Note that a polymer composite was prepared as set forth herein, but containing 0 volume percent of nickel coated carbon fiber (unfilled control sample).

FIG. 5 plots the data from FIG. 3B as the shear storage modulus as a function of initial polymer content for NCCF concentrations of 0 (having no particulate filler), 5, 10, 15, 20, and 30 volume %. FIG. 5 demonstrates that the impact of the processing on the mechanical properties of the composite formed is similar regardless of NCCF concentration thereby enabling the ability to tailor the electrical and mechanical performance of the electrically conductive polymer composite for a specific application target by selecting the applicable particle and solvent loading in the initial particle-filled, non-conductive polymer solution or melt.

Using the method described herein, preparation of an electrically and/or thermally conductive polymer composite having desired mechanical properties and conductive properties can be achieved. One having ordinary skill in the art with knowledge of the invention as set forth herein, would be able to select suitable polymers, solvents and conductive particulate fillers, as well as the amounts of each to employ, to prepare a conductive polymer composite having the mechanical and conductive properties desired.

Electrically or thermally conductive polymer composites have many applications. For example, electrically conductive polymer composites may be implemented into applications such as, for example purposes only, electronic textiles, robotics, EMI shielding and lightning strike protection. Thermally conductive polymer composites within the scope of the present invention may be implemented in applications such as, for example purposes only, heat sinks, heat exchangers and thermal management.

Although specific elastomeric polymers are specifically identified herein, the invention is not intended to be limited to these. One skilled in the art will recognize that suitable elastomeric polymers that may be employed herein include those that when processed as described herein form a crosslinked polymer network with a glass transition temperature such that at normal operating conditions the polymer is flexible.

Moreover, one having ordinary skill in the art will recognize that electrically or thermally conductive particulate fillers of any particle shape, surface roughness, size, or size distribution may be employed herein. One having ordinary skill in the art will further recognize that the particulate concentration of the particulate fillers required to obtain electrical and/or thermal percolation will be impacted by the properties of the particles selected.

In addition, although the invention is described wherein one polymer is mixed with one solvent and one conductive particulate filler, the invention is not intended to be so limited as the use of one or more polymers, one or more solvents, and one or more conductive particulate fillers may be employed in the method and conductive polymer composites herein.

While the foregoing is directed to embodiments of the present invention, other and further embodiments of the invention may be devised without departing from the basic scope thereof.

The invention claimed is:

1. A method of forming an electrically and/or thermally conductive polymer composite, comprising:
    mixing a polymer, a conductive particulate filler, and a solvent compatible with the polymer to form a non-conductive polymer solution or melt; wherein the conductive particulate filler is electrically conductive, thermally conductive, or both; wherein the amount of conductive particulate filler in the non-conductive polymer solution or melt is below the mechanical percolation threshold and the electrical/thermal percolation threshold of the conductive particulate filler therein;

processing the non-conductive polymer solution or melt to form a non-conductive polymer network composition, wherein the polymers in said non-conductive polymer network composition are physically cross linked or a combination of physically and chemically cross linked;

retaining said solvent to adjust a structure of the polymer network and the mechanical properties of said electrically and/or thermally conductive polymer formed through curing; and finally removing said solvent from the non-conductive polymer network composition to concentrate the polymers therein and the conductive particulate filler therein to form an electrically and/or thermally conductive polymer composite.

2. The method of claim 1, wherein the polymers in said non-conductive polymer network composition are physically cross linked.

3. The method of claim 1, wherein the polymers in said non-conductive polymer network composition are a combination of physically and chemically cross linked polymer chains.

4. The method of claim 1, wherein the polymer mixed with said conductive particulate filler and said solvent to form said non-conductive polymer solution or melt is an elastomeric polymer.

5. The method of claim 4, wherein said elastomeric polymer is selected from the group consisting of poly(styrene-b-ethylene-co-butylene-b-styrene), poly(styrene-b-isoprene-b-styrene), poly(styrene-b-butadiene-b-styrene), natural rubber, polybutadiene, chloroprene, butyl rubber, nitrile rubber, silicone elastomer, fluorosilicone rubber, poly(propylene oxide) rubber, and epoxy elastomer.

6. The method of claim 1, wherein the conductive particulate filler is at least one conductive particulate filler selected from the group consisting of, nickel spheres, graphene flakes, nickel flakes, gold flakes, silver flakes, or other metal flakes, nickel nanostrands, nickel coated carbon fibers, nickel coated carbon nanotubes, gold spheres, gold nanorods, silver spheres, silver nanorods, copper spheres, copper nanorods, carbon nanofiber, polyaniline, polythiophene, polyacetylene, polyphenylene sulfide, polyphenylene vinylene, aluminum nitride, aluminum oxide, beryllium oxide, boron nitride, diamond, gallium arsenide, glass, indium phosphide, sapphire and sodium chloride.

7. The method of claim 1, wherein the amount of conductive particulate filler in the non-conductive polymer solution or melt is about 0.01 volume percent to about 55 volume percent.

8. The method of claim 1, wherein the solvent is miscible with the polymer.

9. The method of claim 8, wherein the solvent is at least one solvent selected from the group consisting of dibutyl phthalate, mineral oil, polydimethylsiloxane, water, acetone, methanol, ethanol, propanol, ethylhexanol, dodecane, decanol, cylcohexane, butanol, tetrahydrofuran, polydiethylsiloxane, chloroform, methylene chloride, ethylene glycol, methyl ethyl ketone, acetophenone, dimethyl sulfoxide, and bis-ethyl hexyl sebacate.

10. The method of claim 1, wherein the amount of solvent in the non-conductive polymer solution or melt is about 10 volume percent to about 95 volume percent.

11. The method of claim 1, wherein said method comprises removing about 10 volume percent to about 95 volume percent of the solvent from the non-conductive polymer network composition.

12. The method of claim 1, further comprising extruding the non-conductive polymer network composition into a desired form.

13. The method of claim 1, wherein the polymer present in said non-conductive polymer solution or melt is poly(styrene-b-ethylene-co-butylene-b-styrene),
wherein the solvent is mineral oil, and
wherein the conductive particulate filler is nickel-coated carbon fibers.

14. The method of claim 13, wherein approximately 95% of the mineral oil is removed from the non-conductive polymer network composition.

* * * * *